United States Patent Office 3,183,360
Patented May 11, 1965

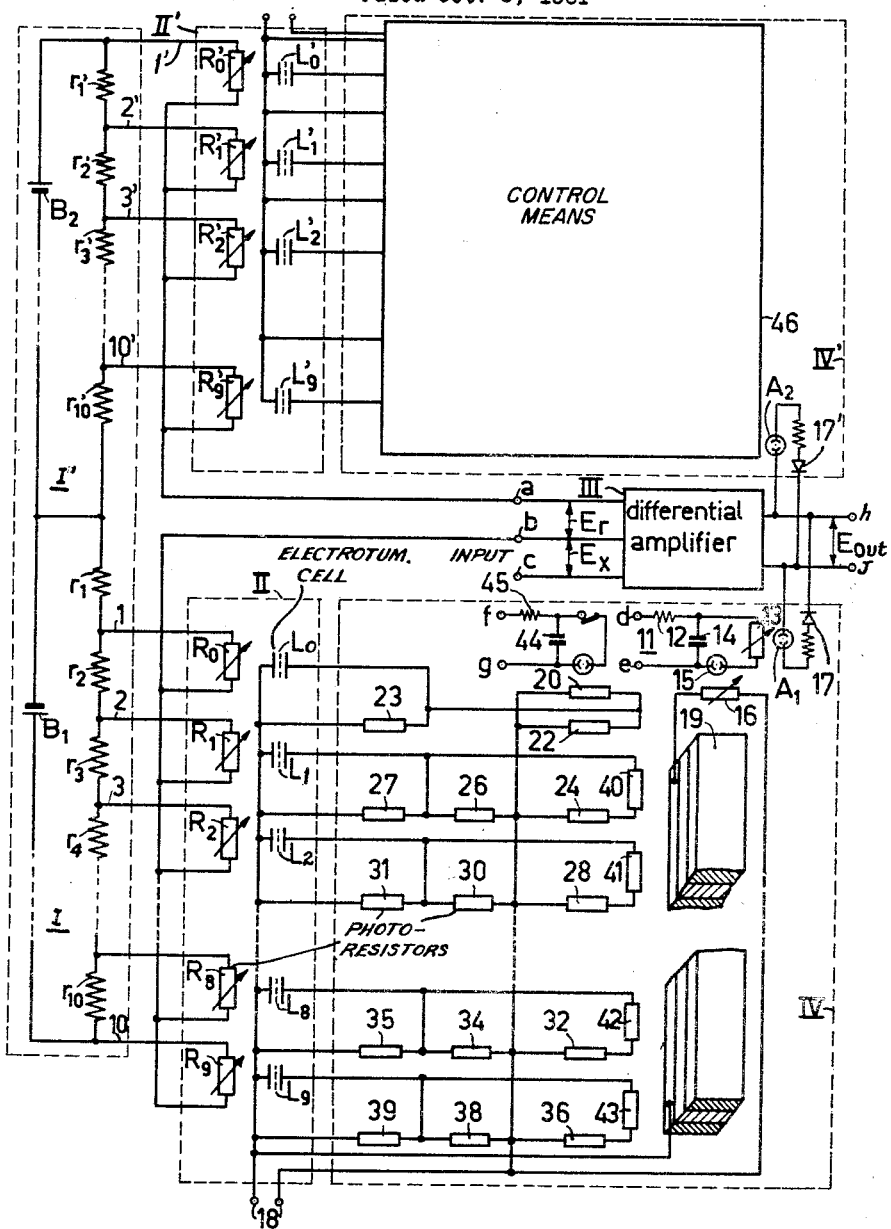

3,183,360
SIGNAL AMPLITUDE ANALYZER
Johannes Gerrit van Santen, Eindhoven, Netherlands, assignor to North American Philips Company, Inc., New York, N.Y., a corporation of Delaware
Filed Oct. 5, 1961, Ser. No. 143,143
Claims priority, application Netherlands, Oct. 11, 1960, 256,750
13 Claims. (Cl. 259—208)

This invention relates to a signal amplitude analyzer and more particularly to signal amplitude analyzers of the type in which the amplitude of one signal is compared in exclusive intervals with predetermined discrete amplitude levels of a known reference signal.

The utilization of mechanical switches in signal amplitude analyzers to compare the amplitude of one signal with, for example, two known reference signal amplitudes has several disadvantages, a few of which are slow response, contact arcing, increased size in dimensions and/or weight. These disadvantages may produce other undesired and deleterious effects in the system from which the signal to be analyzed is derived and/or as well as in circuitry of the analyzer itself. For analyzers in which more than two reference signal amplitudes are utilized in the analysis such as, for example, a digial analyzer, the disadvantages and their ill effects are further compounded.

It is often desirable in certain applications such as, for example, in computer systems and the like, to provide a visual signal indicative of the amplitude level of the reference signal being utilized in the anlysis. However, with the analyzers available in the prior art, suitable visual indicator means are not amenable to incorporation with the analyzer circuitry without a considerable amount of modification, nor heretofore was such a visual signal utilized to control the switching or sampling action for effectuating the comparison in the aforementioned exclusive intervals.

An object of this invention, therefore, is to provide a signal amplitude analyzer which automatically and rapidly compares the amplitude of one signal with the amplitude levels of another signal in exclusive intervals without the use of mechanical switches and the like.

Another object of this invention is to provide a signal amplitude analyzer in which the automatic comparison previously mentioned continues until the amplitude of the signal being analyzed is in a predetermined condition of balance with a predetermined one of the amplitude levels of the reference signal utilized in the analysis.

Still other objects of this invention are to provide a signal amplitude analyzer of the type described which is amenable to microminiaturization techniques and/or is suitable to digital analyzer applications utilized in, for example, computer systems, digital voltmeters, etc.

Accordingly, this invention features a circuit arrangement for analyzing the amplitude of a given signal which comprises, inter alia, a source of reference signal having a plurality of outputs at discrete amplitude levels of the reference signal. In addition, means for sampling the discrete amplitude levels in mutually exclusive intervals and means for comparing the amplitude of the given signal and the amplitude levels of the reference signal to provide an output signal proportional to the amplitude of the given signal and the sampled amplitude level of the reference signal are also provided. The means for sampling comprises a plurality of photosensitive elements, each of the photosensitive elements being coupled to one of the outputs of the reference signal source, and a plurality of light sources which are responsive to the output signal of the comparing means and which activate the photosensitive elements for sampling the discrete amplitude levels in the mutually exclusive intervals and which stop the sampling at a predetermined condition of balance of the amplitude levels of said given and reference signals.

Another feature of this invention is to provide a circuit arrangement of the aforedescribed type wherein the photosensitive elements comprise photoelectric resistances and the light sources comprise electroluminescent elements.

The above-mentioned and other features and objects of this invention will become apparent by reference to the following description taken in conjunction with the accompanying drawing, in which:

The single figure is a schematic diagram, partly in block form, of the circuit arrangement of this invention, and more particularly of an embodiment utilized as a digital voltage analyzer.

It is to be understood that the digital voltage analyzer embodiment illustrated in the figure is chosen by way of example only, and that other embodiments as, for example, an analyzer utilizing two or more reference amplitude levels, capable of utilizing the principles of this invention will be obvious to those skilled in the art.

Broadly describing the invention and referring to the figure, there is illustrated a circuit arrangement for analyzing the amplitude level of a given signal $E_x$ which comprises a source of reference signal $E_r$ with a part I having a plurality of outputs 1, 2, 3 etc. at discrete amplitude levels of the reference signal. Sampling means II couples one end of part I of the reference signal source to the input terminal $b$ of a comparison means illustrated as a differential amplifier III, the other end being coupled to the input terminal $a$ via, for this particular embodiment, a similar part I' of the reference signal source and sampling means II' as will be explained in greater detail hereinafter. As is obvious, in embodiments utilizing only a single part I, the aforementioned other end would be coupled directly to the input terminal $a$. Means II samples the discrete amplitude levels in mutually exclusive intervals, and means III provides an output signal $E_o$ proportional to the amplitude of the given signal which is applied to input terminals $b$, $c$ and the particular amplitude level of the reference signal being sampled. The means II for sampling comprises a plurality of photosensitive elements $R_0$, $R_1$, $R_2$, etc., each of which is coupled to one of the outputs 1, 2, 3 of the reference signal source, and a plurality of light sources which are responsive to the output signal $E_o$ via a suitable control means IV. The light sources activate the photosensitive elements for sampling the discrete amplitude levels in mutually exclusive intervals and stop the sampling at a predetermined condition of balance of the amplitude levels of the given signal $E_x$ and of the reference signal $E_r$.

Referring to the figure in greater detail, part I of the reference signal source comprises, for example, a voltage source, battery $B_1$, which shunts a voltage divider having ten equal resistors $r_1$, $r_2$, $r_3$, etc. As aforementioned, the sampling means II comprises ten photosensitive elements, $R_0$, $R_1$, etc. and ten light sources $L_0$, $L_1$, etc.

Each light source $L_0$, $L_1$, etc. is in exclusive optical coupling relationship with one of the photosensitive elements, to wit, $R_0$, $R_1$, etc. respectively. In response to the output signal $E_o$, each light source is sequentially ignited during exclusive intervals so that the associated photosensitive element conducts and allows the amplitude level of the reference signal to be coupled to the differential amplifier and the comparison to be made. When the amplitude levels are in a balanced condition, the light source remains ignited and the sampling ceases.

In order to ignite the light sources during the aforementioned exclusive intervals and provide the aforedescribed stopping action, in the control means IV there is provided a relaxation oscillator circuit 11 comprising charging resistor 12, and the parallel combination of capacitor 14 and the series connected photosensitive element 13 and neon lamp 15, and a suitable voltage supply, not shown, which is connected via terminals $d$, $e$. Element 13 is in exclusive optical coupling relationship with a neon lamp $A_1$, which is ignited in accordance with a respective predetermined polarity of the output signal $E_o$, diode 17 being suitably connected and poled to the output of the comparing means, differential amplifier III, to provide this function. A photosensitive element 16 is serially connected to an electroluminescent strip 19, illustrated in isometric projection, and a suitable voltage source, not shown, as for example, 200 A.C. volts having a 1000 cycles per second frequency, the latter being coupled to terminals 18. Element 16 is in exclusive optical coupling relationship with lamp 15 and is thus activated by its periodic flashes when the relaxation circuit 11 is made operative.

The initial light source $L_0$ is connected to a pair of parallel connected photosensitive elements 20, 22 which are in exclusive optical coupling relationship with neon lamp $N_1$ and light source $L_0$, respectively. The aforementioned voltage supply, not shown, which is connected to terminals 18, also provides a suitable potential for light source $L_0$. Shunting light source $L_0$ is photosensitive element 23 which is in exclusive optical coupling relationship with succeeding light source $L_1$. Activation of element 23 short circuits light source $L_0$ causing $L_0$ to be extinguished.

Each of the subsequent light sources $L_1$ to $L_9$ have an identical network associated therewith. These networks are each commonly supplied by the previously mentioned voltage source which is connected to terminals 18. The components of each network will be described with reference to the light source $L_1$, it being understood that the remaining subsequent light sources have similar components and actions. Thus, the network associated with light source $L_1$ comprises a parallel combination having a single photosensitive element 26 in one branch and two series-connected photosensitive elements 24, 40 in the other, the parallel combination 26, 24, 40, being serially connected to light source $L_1$ across the terminals 18. In addition, a fourth photosensitive element 27 is connected in parallel with light source $L_1$. Elements 24, 26, 27 and 40 are in exclusive optical coupling relationship with the preceding light source $L_0$, light source $L_1$, succeeding light source $L_2$ and the light source, i.e. electroluminescent strip 19, respectively. As aforementioned, each of the appropriate corresponding elements of the remaining subsequent networks have similar optical couplings with the appropriate respective preceding and succeeding light sources and in the last of the aforementioned subsequent networks, the element 39 is in exclusive optical coupling relationship with light source $L_0$.

A suitable initiating circuit, comprising the neon lamp $N_1$, capacitor 44, resistor 45, switch S and a suitable source of voltage, not shown, that is connected to terminals $f$, $g$ is also provided in control means IV. In the control means IV', the countercomponent, not shown, of switch S is adapted to open and close simultaneously with the opening and closing, respectively, of switch S.

Control means IV' is also provided with similar components of the counterparts found in means IV. However, the means IV' is adapted to actuate light source $L_9'$ initially and subsequently light sources $L_8'$ (not shown), etc. to $L_0'$, respectively. In addition, lamp $A_2$ is adapted to be ignited via diode 17' by a polarity of output signal $E_o$ which is opposite to that required to activate lamp $A_1$. For the sake of clarity, the components of means IV', with the exception of the series circuit associated with lamp $A_2$, is illustrated by the box 46.

Before, or simultaneously therewith, the circuit arrangement of the figure is placed into operation for analysis of a given signal $E_x$, any of the aforementioned subsequent light sources of the sampling means II or II' which remain ignited as the result, for example, of a previously performed analytical operation, are extinguished, such an operation hereinafter being referred to as a clearing operation. To perform the clearing operation, the appropriate photosensitive elements which are connected in parallel with the respective subsequent light sources, for example, the elements 27, 31, etc. of means IV associated with the subsequent light sources $L_1$ to $L_9$ of means II, are also placed in optical coupling relationship with the light source, lamp $N_1$, thereby short-circuiting and extinguishing any associated subsequent light sources $L_1$, $L_2$, etc. that may have previously been in a state of ignition. A similar operation takes place in means IV' which causes subsequent light sources $L_0'$ to $L_9'$ to be extinguished. Alternatively, these same photosensitive elements may be activated by an independent light source, not shown, which is temporarily ignited, simultaneously or prior to the ignition of lamp $N_1$, in which case the appropriate photosensitive elements in both means IV and IV' may be activated by a common light source, not shown.

In the particular embodiment of the invention illustrated in the figure; viz., a digital analyzer, batteries $B_1$ and $B_2$, which are connected in polarity opposition, are 1.0 and 0.1 volts, respectively. Thus, the first voltage divider has a voltage drop across each of its resistors $r_1$, $r_2$, etc. equal to 0.1 volt and the second voltage divider has a voltage drop equal to 0.01 volt across each of its resistors $r_1'$, $r_2'$, etc. with the respective parts I and I' capable of being analyzed, therefore, with the tenths and hundredths decimal positions, respectively, of the given signal $E_x$. For the particular embodiment, if the difference between the amplitudes of the given signal $E_x$ and the reference signal $E_r$ is above a certain input level, for example, 0.005 volt, and of a certain polarity type, the output signal $E_o$ is provided with a polarity sufficient to cause a predetermined one of the two lamps $A_1$ or $A_2$ to be ignited exclusively. If the difference between the amplitudes of the signals $E_x$ and $E_r$ is also above a certain input level, which is, but need not be, equal to that of the aforementioned input level but is of a polarity opposite to the aforementioned predetermined type, then output signal $E_o$ will have an opposite polarity and the other of the two lamps $A_1$ or $A_2$ will be ignited. However, when the difference in amplitudes of the signals $E_x$ and $E_r$ is between the two selected input levels, which in the example is between ±0.005 volt, then the output signal $E_o$ will be at a null and neither of the lamps $A_1$ or $A_2$ will ignite. If desired, a null measuring means as, for example, a null meter, not shown, may be coupled to the output terminals $h$, $j$ of amplifier III to detect the balanced condition and thereby confirm the balanced condition between the amplitude of signals $E_x$ and $E_r$. It will become obvious hereinafter to those skilled in the art that other adjacent decimal positions may be represented by the parts I and I' and that the circuit of the figure can be further modified, if desired, to include further parts for the reference source and the associated sampling and control means therefor to increase further the number of available digital positions such as, for example, the unit, thousands, etc. decimal positions and thereby increase the range and/or accuracy of the signal amplitude analyzer. In such cases, each additional battery is connected in polarity opposition to the preceding battery to which it is coupled.

In operating the circuit of the figure, switch S is temporarily closed whereby capacitor 44 discharges through and ignites lamp $N_1$. Ignition of lamp $N_1$ and its consequential illuminating of photosensitive elements 27, 31 ... 35, 39 performs the aforementioned clearing operation which extinguishes or turns off any of the subsequent light sources $L_1$ to $L_9$ which may be in a previous state of illumination, i.e. in a condition of irradiating light. Lamp $N_1$ also illuminates photosensitive element 20 as a result of which light source $L_0$ irradiates, if it is not already irradiating because, for example, of some previously performed analytical operation. The light radiated from source $L_0$ illuminates, respectively, (i) photosensitive element $R_0$, thereby connecting the output 1 of the reference source to terminal $b$ of the amplifier III, (ii) photosensitive element 22 thereby maintaining light source $L_0$ in an illuminating state when the lamp $N_1$ becomes extinguished, and (iii) photosensitive element 24, which in coaction with element 40 and strip 19 provides further sampling, if required, as will become apparent hereinafter. Similar actions occur in part I′ and means II′ and IV′, whereby light source $L_9'$ illuminates and couples output 10′ to terminal $a$, via the photosensitive element $R_9'$ activated thereby. As is obvious, if the light source $L_0$ was in a previous illuminated state, it does not effect the immediate operation because of the parallel arrangement of elements 22 and 20.

Assuming, by way of example only, that the amplitude of the signal $E_x$ is 0.86 volt, by judiciously connecting the signal $E_x$ to the terminals $b$, $c$ with the proper polarity, the difference between the amplitudes of the signal $E_x$ and that of the signal $E_r$ which is sampled will exceed the aforementioned example of the input level and be of the polarity type that causes the output signal $E_o$ to ignite lamp $A_1$. Lamp $A_1$, in turn, illuminates photosensitive element 13, thus triggering the operation of the relaxation oscillator circuit 11 and resulting in the strip 19 illuminating or radiating a pulse of light each time the photosensitive element 16 is activated by the periodic flashes of the neon lamp 15. When electroluminescent strip 19 illuminates the photosensitive element 40 which is serially connected to the element 24 that is illuminated by light source $L_0$, the source $L_1$ will also begin to radiate light. The light from source $L_1$ illuminates, respectively, (a) photosensitive element $R_1$, thereby connecting the next output 2 to terminal $b$, (b) photosensitive element 26 thereby maintaining light source $L_1$ in an illuminating state when the light radiation from source $L_0$ and/or the periodic light radiation from strip 19 cease to illuminate element 24 and 40, respectively, (c) photosensitive element 23 which causes the light radiation from source $L_0$ to cease, and (d) photosensitive element 28 which in coaction with element 41 and strip 19 causes further sampling of the next output 3, if required, and as is the case in the present example. However, because the lamp $A_2$ in control means IV′ is not ignited, the output 10′ remains connected to terminal $a$, as long as the difference in amplitudes of the signals $E_x$ and $E_r$ continues to be of the same polarity type.

When the elements 28 and 41 and the strip 19 coact, the source $L_2$ radiates light illuminating photosensitive elements $R_2$, 30, 27, and the next element, not shown, which is optically coupled to strip 19, resulting in a cycle with respect to source $L_2$ similar to the cycle (a), (b), (c), (d) described above with respect to source $L_1$. Thus, in the given example, the sampling continues in discrete intervals, until the source 8 radiates light. However, at this time, the difference in amplitude levels, while still being in excess of the aforementioned input level, reverses in polarity type causing the lamp $A_1$ to become extinguished and lamp $A_2$ to ignite. Extinguishment of lamp $A_1$ causes the oscillations of the relaxation oscillator to stop and, consequently, the periodic light radiations of strip 19, which prevents further sampling by the means II. Due to the illumination of photosensitive element 34 by the light from source $L_8$, however, light source $L_8$ remains in the light radiating condition.

Ignition of lamp $A_2$ initiates the periodic light radiations from an electroluminescent strip 19′, not shown, located in means IV′. As a consequence, for the given amplitude example of signal $E_x$, each of the outputs 9′, 8′, and 7′ will be sampled in successive intervals and in the order stated. When the light source $L_6'$, not shown, illuminates photosensitive element $R_6'$, not shown, output 7′ is connected to terminal $a$ and the sampling stops since, in the given example, the difference in amplitudes of the signals $E_x$ and $E_r$ is less than the input level of the amplifier III which causes a null in the output signal $E_o$ insufficient, as a forementioned, to support ignition of either of the lamps $A_1$ or $A_2$. Thus, it is seen that the light sources $L_8$ and $L_6'$ remain in their illuminating condition once the sampling stops and, thereby, provides a visual signal indicative of the amplitude of the signal $E_x$ being analyzed and particularly of the respective decimal positions thereof. A subsequent closure of the switch S will again recycle the circuit arrangement of the figure for analysis of the same or different amplitude values of an applied signal $E_x$.

In practicing the principles of this invention, it is preferred that the photosensitive components comprise photoelectric resistors and the light source components comprise electroluminescent elements since these types of components are readily adaptable for microminiaturization and/or printed circuits. In particular, the photosensitive elements $R_0$ to $R_9$, and/or $R_0'$ to $R_9'$, are preferred to be photoelectric resistances made of cadmium selenide (CdSe) sintered to two plates each of ten elements which exhibit a dark resistance at least a thousand times greater than their resistance in the illuminated state. The cells which are still luminescent after the light pulses from the strips 19, 19′ (not shown) have ceased, i.e. when lamps $A_1$ and $A_2$ are both extinguished, provides, as aforementioned, a visual indicating signal of the measured signal $E_x$. Alternatively, if desired, an independent visual indicating means, not shown, may be made sensitive to the luminescent cells to provide the aforementioned visual indication signal.

Suitable screening and/or optical techniques may be utilized to optically couple the particular photosensitive elements to their respective related actuating light sources and prevent interfering light coupling relationships between non-related components. Alternatively, or in conjunction with these techniques, where photoelectric resistors are utilized in the circuit arrangement of the invention, predetermined photoelectric resistors may be provided with different response times by changing, for example, their physical properties or compositions. For example, it can be insured that when the strip 19 produces a light flash, that only the light source (e.g. $L_2$) following the previous luminescent light source ($L_1$) will ignite and the next following light source ($L_3$) will not, if the photoelectric resistors 24, 28 . . . 32, 36 are made of cadmium sulphide which will respond slower than the cadmium selenide of which the other photoelectric resistors are selected to be made.

It is to be understood that the described circuit arrangement, as well as the modifications described above, are intended to be by way of example only and that other modifications may be utilized by those skilled in the art without departing from the scope of my invention. Thus, while I have described above the principles of my invention in connection with specific apparatus, it is to be clearly understood that this description is made only by way of example and not as a limitation to the scope of my invention as set forth in the objects thereof and in the accompanying claims.

I claim:

1. A circuit arrangement for analyzing the amplitude of a given signal comprising, a source of reference signal having a plurality of output terminals for providing discrete amplitude levels of said reference signal, means for sampling said discrete amplitude levels in mutually exclusive time intervals, means for comparing the amplitude of said given signal and the sampled amplitude levels of said reference signal to provide an output signal proportional to the difference of said signals, said sampling means comprising a plurality of photosensitive elements, each of said elements being coupled to an individual output terminal of said reference signal source and to the input of said comparing means, a plurality of light sources optically coupled to said photosensitive elements, and control means responsive to said output signal for selectively energizing said light sources thereby to selectively activate said photosensitive elements in said mutually exclusive time intervals, said control means further comprising means responsive to said output signal for terminating said sampling at a predetermined level of said output signal.

2. A circuit arrangement as described in claim 1 wherein said control means further comprises voltage responsive electroluminescent means and means responsive to said output signal for intermittently energizing said electroluminescent means, input terminal means for a source of electrical energy, a plurality of second photosensitive elements, a plurality of third photosensitive elements, means for connecting one each of said second photosensitive elements and one each of said third photosensitive elements in series circuit with an individual one of said light sources and said input terminal means thereby forming a plurality of parallel connected series circuits across said input terminal means, means for optically coupling each of said second photosensitive elements with a light source of a different series circuit, and means for optically coupling said electroluminescent means with said plurality of third photosensitive elements.

3. Apparatus for analyzing the amplitude of a given signal voltage and providing a visual indication representative thereof, comprising a source of reference voltage including means for providing a plurality of discrete voltage amplitude levels, means for sampling said discrete amplitude levels, means for comparing the amplitude of said given signal voltage and the amplitude levels of said reference voltage to provide an output signal dependent upon the relative amplitudes thereof, said sampling means comprising a plurality of photosensitive elements each of which is electrically coupled with an individual amplitude level of said reference voltage source and a plurality of light sources each of which is optically coupled to an individual one of said photosensitive elements to activate same, and control means responsive to said output signal for selectively controlling said light sources to sample said discrete amplitude levels of said reference voltage and further including means for stopping said sampling at a predetermined condition of balance of the amplitude levels of said given and reference voltages whereby said visual indication representative of said signal voltage amplitude is provided by a selected one of said light sources.

4. Apparatus for analyzing the amplitude of a given signal voltage comprising a source of reference voltage including means for providing a plurality of discrete voltage amplitude levels, means for sequentially sampling said discrete amplitude levels, means for comparing the amplitude of said given signal voltage and the amplitude levels of said reference voltage to provide an output signal dependent upon the relative amplitudes thereof, said sampling means comprising a plurality of photosensitive elements each of which is electrically coupled with an individual amplitude level of said reference voltage source and a plurality of light sources each of which is optically coupled to an individual one of said photosensitive elements to activate same, and control means responsive to said output signal for controlling said light sources to sequentially sample said discrete amplitude levels of said reference voltage, said control means comprising a periodic light source responsive to said output signal for sequentially controlling the energization of said light sources, input terminal means for energizing said light sources, a plurality of other photosensitive elements each of which is optically coupled to an individual one of said light sources, means for connecting each of said light sources in series circuit with its associated other photosensitive element and to said input terminal means, and means responsive to said output signal for terminating said sampling at a predetermined condition of balance of the amplitude levels of said given and reference voltages.

5. Apparatus for analyzing the amplitude of a given signal voltage comprising a source of reference voltage including means for providing a plurality of discrete equal voltage amplitude levels, means for sequentially sampling said discrete amplitude levels, means for comparing the amplitude of said given signal voltage and the amplitude levels of said reference voltage to provide an output signal dependent upon the relative amplitudes thereof, said sampling means comprising a plurality of photosensitive elements each of which is electrically coupled with an individual amplitude level of said reference voltage source and a plurality of light sources arranged in a predetermined sequence each of which is optically coupled to an individual one of said photosensitive elements to activate same, and control means responsive to said output signal for controlling said light sources to sequentially sample said discrete amplitude levels of said reference voltage, said control means comprising an intermittently energized light source responsive to said output signal for sequentially controlling the energization of said light sources, input terminal means for energizing said light sources, a plurality of other photosensitive elements each of which is connected in parallel with an individual one of said light sources, means for connecting each of said parallel connected light sources and photosensitive elements to said input terminal means, each of said other photosensitive elements being optically coupled with the following light source in sequence, and means responsive to said output signal for deenergizing said intermittent light source thereby terminating said sampling at a predetermined condition of balance of the amplitude levels of said given and reference voltages.

6. Apparatus for analyzing the amplitude of a given signal voltage comprising a source of reference voltage including means for providing a plurality of discrete voltage amplitude levels, means for sampling said discrete amplitude levels in mutually exclusive intervals, means for comparing the amplitude of said given signal voltage and the amplitude levels of said reference voltage to provide an output signal dependent upon the relative amplitudes thereof, said sampling means comprising a plurality of photosensitive elements each of which is operatively coupled with an individual amplitude level of said reference voltage source and a plurality of light sources each of which is optically coupled to an individual one of said photosensitive elements to activate same, and control means responsive to said output signal for controlling said light sources to sample said discrete amplitude levels of said reference voltage, said control means comprising a periodic light source responsive to said output signal for controlling the energization of said light sources, input terminal means for energizing said light sources, a plurality of circuit networks each of which is operatively coupled with a different one of said light sources, each of said networks comprising a first photosensitive element optically coupled to its associated light source and serially connected with said associated light source to said input terminal means and a second photosensitive element connected in parallel with said associated light source and optically coupled to the light source associated with the succeeding network, said control means further comprising means responsive to said output signal for terminating said sampling at a predetermined condition of balance of the amplitude levels of said given and reference voltages.

7. Apparatus as defined in claim 6 wherein each of said circuit networks further comprises third and fourth photosensitive elements, means for connecting said third and fourth photosensitive elements and their associated light source in series circuit to said input terminal means, said third photosensitive element being optically coupled with the light source of the preceding network and said fourth photosensitive element being optically coupled with said periodic light source to cause said associated light source to ignite whenever said third and fourth photosensitive elements are simultaneously illuminated by their respective optically coupled light sources.

8. Apparatus as defined in claim 7 wherein said control means further comprises a relaxation generator responsive to said output signal for periodically actuating said periodic light source.

9. Apparatus as defined in claim 7 wherein said photosensitive elements comprise photoelectric resistances and said light sources comprise electroluminescent elements.

10. Apparatus as defined in claim 7 wherein said periodic light source comprises an electroluminescent element.

11. A circuit arrangement for analyzing the amplitude of a given signal, said arangement comprising a source of reference signal having a plurality of outputs at discrete amplitude levels of said reference signal, means for sampling said discrete amplitude levels in mutually exclusive intervals, means for comparing the amplitude of said given signal and the amplitude levels of said reference signal to provide an output signal proportional to the amplitude level of said given signal and the sampled amplitude level of said reference signal, said means for sampling comprising a plurality of photosensitive elements, each of said photosensitive elements being coupled to one of the outputs of said reference signal source, and a plurality of light sources to activate said photosensitive elements, and means responsive to said output signal to control said light sources for sampling said discrete amplitude levels in said mutually exclusive intervals and stopping said sampling at a predetermined condition of balance of the amplitude levels of said given and reference signals, said control means comprising a periodic light source responsive to said output signal, an input circuit for a source of electrical energy, and a plurality of networks, each of said networks being associated exclusively with a different one of the light sources of said sampling means and comprising a first photosensitive element serially connected to said associated light source and said input circuit, a second photosensitive element connected in parallel to said associated light source and optically coupled with the light source associated with the succeeding network to extinguish said associated light source whenever the light source of said succeeding network illuminates said second photosensitive element, and photosensitive means connected in parallel with said first photosensitive element to initiate the light output of said associated light source whenever said first and second photosensitive elements are not illuminated, at least one network having the respective photosensitive means thereof comprising a single photosensitive element serially connected to the associated light source of said one network and in optical coupling relationship with a predetermined light signal, and the other networks having each of their respective photosensitive means comprising third and fourth serially coupled photosensitive elements connected in parallel with said first photosensitive element, said third photosensitive element being in optical coupling relationship with the light source of the preceding network and said fourth photosensitive element being in optical coupling relationship with said periodic light source to cause said associated light source to ignite whenever said third and fourth photosensitive elements are simultaneously illuminated by their respective activating light sources.

12. A circuit arrangement according to claim 11 wherein said photosensitive elements comprise photoelectric resistances and said light sources comprise electroluminescent elements.

13. A circuit arrangement according to claim 12 wherein said periodic light source comprises an electroluminescent element.

References Cited by the Examiner
UNITED STATES PATENTS

| | | | |
|---|---|---|---|
| 2,961,546 | 11/60 | Springes et al. | 250—208 |
| 2,965,891 | 12/60 | Martin | 340—347 |
| 2,988,645 | 6/61 | Willmotte | 250—209 |
| 3,026,416 | 3/62 | Weimer | 250—208 X |
| 3,037,076 | 5/62 | Williams et al. | 250—209 X |
| 3,038,080 | 6/62 | Matarese | 250—208 |
| 3,102,921 | 9/63 | Peras | 250—209 X |

RALPH G. NILSON, *Primary Examiner.*